US011356871B2

(12) United States Patent
Frenger et al.

(10) Patent No.: US 11,356,871 B2
(45) Date of Patent: Jun. 7, 2022

(54) METHODS AND SYSTEMS FOR SPECTRUM LICENSE MANAGEMENT

(71) Applicant: Telefonaktiebolaget LM Ericsson (publ), Stockholm (SE)

(72) Inventors: Pål Frenger, Linköping (SE); Mats Buchmayer, Enskede Gard (SE); Jan Hederen, Linghem (SE); Gösta Lemne, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/962,887

(22) PCT Filed: Jul. 5, 2018

(86) PCT No.: PCT/EP2018/068269
§ 371 (c)(1),
(2) Date: Jul. 17, 2020

(87) PCT Pub. No.: WO2020/007477
PCT Pub. Date: Jan. 9, 2020

(65) Prior Publication Data
US 2021/0076233 A1   Mar. 11, 2021

(51) Int. Cl.
*H04W 24/04* (2009.01)
*H04L 43/12* (2022.01)
*H04W 52/24* (2009.01)

(52) U.S. Cl.
CPC ............ *H04W 24/04* (2013.01); *H04L 43/12* (2013.01); *H04W 52/24* (2013.01)

(58) Field of Classification Search
CPC ..... H04W 24/04; H04W 52/24; H04W 16/14; H04W 24/08; H04W 24/10; H04L 43/12
See application file for complete search history.

(56) References Cited

U.S. PATENT DOCUMENTS 9,112,645 B2 *   8/2015   Hassan ................... H04L 1/203
9,986,582 B2 *   5/2018   Wang ................ H04W 72/1215
(Continued)

FOREIGN PATENT DOCUMENTS

WO   2015197537 A1   12/2015

OTHER PUBLICATIONS

PCT International Search Report and Written Opinion dated Mar. 15, 2019 for International Application PCT/EP2018/068269, 19 pages.

*Primary Examiner* — Chandrahas B Patel
(74) *Attorney, Agent, or Firm* — Sage Patent Group

(57) ABSTRACT

A method for a primary user device of a spectrum license used for allowing radio communication in a wireless communication network covering a local area to which the spectrum license is limited, wherein the method comprises: providing at least one spectrum compliance probe within the local area; detecting, using the at least one spectrum compliance probe, within the local area one or both of (i) a first interference caused by a first signal originating from within the local area, wherein the first interference is not allowed by the spectrum license, and (ii) a second interference caused by a second signal originating from outside the local area, wherein the second interference is not allowed by the spectrum license; and controlling the radio communication in response to said detection.

20 Claims, 7 Drawing Sheets

(56) References Cited

U.S. PATENT DOCUMENTS

| | | | |
|---|---|---|---|
| 11,012,121 B2* | 5/2021 | Fukui | H04W 72/0473 |
| 2008/0075059 A1 | 3/2008 | Kermoal et al. | |
| 2008/0279092 A1 | 11/2008 | Hassan et al. | |
| 2014/0294109 A1* | 10/2014 | Cheong | H04B 7/0619 |
| | | | 375/267 |
| 2015/0365155 A1 | 12/2015 | Subramanian et al. | |
| 2018/0084555 A1 | 3/2018 | Mori et al. | |

* cited by examiner

METHODS AND SYSTEMS FOR SPECTRUM LICENSE MANAGEMENT

CROSS-REFERENCE TO RELATED APPLICATIONS

This application is a 35 U.S.C. § 371 national stage application for International Application No. PCT/EP2018/068269, entitled "METHODS AND SYSTEMS FOR SPECTRUM LICENSE MANAGEMENT", filed on Jul. 5, 2018, the disclosures and contents of which are hereby incorporated by reference in their entireties.

TECHNICAL FIELD

The present invention generally relates to a method applied to a primary user device of a spectrum license used for allowing radio communication in a wireless communication network covering a local area to which the spectrum license is limited, a computer program product comprising program code portions for performing the method, a spectrum compliance probe which is provided within the local area covered by the wireless communication network, a control unit for controlling radio communication in the wireless communication network which covers the local area to which the spectrum license is limited, and a system comprising the spectrum compliance probe and the control unit.

BACKGROUND

The 3GPP New Radio (NR) standard as well as the LTE evolution standard are both targeting some new demanding use-cases, such as "ultra-reliable low latency communication" (URLLC) and/or critical machine type communication (C-MTC).

There are many radio-based applications, for example "Internet of Things" (IoT) applications, where un-licensed performance may be fully sufficient, but that is not the case, for example, for mission critical URLLC. Systems operating in an un-licensed spectrum always include the effect that when two or more overlapping systems increase traffic, they are bound to eventually pass the break-down point, where the networks become unstable and lock up. In contention-based access mechanisms, access to an available channel will also be opportunistic based on the availability of spectrum and therefore meeting critical latency requirements are not possible in current technologies.

Business- and/or mission-critical radio-based solutions (for example business- and/or mission-critical IoT solutions) will require spectrum licensing in order to offer predictable performance. The need for such mission-critical industrial IoT services frequently appears on private property. Examples include industrial sites and harbors, but also, for example, airports, hospitals, sports arenas and shopping centers, etc.

One possible solution to obtain spectrum for industrial radio-based communication systems, such as IoT systems, would be for enterprises to sign a Service Level Agreement (SLA) with mobile network operators (MNOs) to fulfill their needs. However, experience from 2G, 3G and 4G shows that MNOs in general have not been able to fully satisfy the needs for high traffic volume or high reliability services in private areas. Furthermore, many industry stakeholders clearly indicate that they do not want to become dependent on operator services and spectrum. Consequently, there is a risk that the market for certain business- and/or mission-critical radio-based (for example IoT) systems for industries and events will not develop if verticals cannot secure protected spectrum at terms they consider acceptable.

Though most new spectrum for 5G is expected to be licensed for traditional wide area coverage, there are good reasons to believe that a limited portion of the spectrum needs to be set aside for licensing according to the needs of these demanding "verticals" and their services. This is today recognized by a number of major industrial players, and these are forming interest groups to secure their interests (for example the 5G Alliance for Connected Industries and Automation).

SUMMARY

It has been realized by the inventors that, for the above reasons, it may be critical to secure a protected, licensed spectrum, for example for industrial enterprises for their local needs, for example for radio-based scenarios, such as but not limited to wireless IoT on industrial camps, harbors etc., as it may be unlikely that this can be done in un-licensed bands.

A spectrum licensing solution based on (well-defined) local areas (for example property-based)—noting that currently no local area spectrum licensing mechanisms are implemented—may create several new problems that require solutions. For example, interference from devices near the local area or property border is an issue for which there is currently no solution in the state-of-the-art. Providing proof of spectrum license compliance to a regulator (which may be a wide area license owner) might also be required. And proving that a spectrum license is being violated by some external interferer might be needed. Ensuring high spectrum efficiency may also be important. How to automatically determine a maximum power level to all nodes and devices may need to be considered.

According to an aspect of the present disclosure, there is therefore provided a method for a primary user device of a spectrum license used for allowing radio communication in a wireless communication network covering a local area to which the spectrum license is limited, wherein the method comprises: providing at least one spectrum compliance probe within the local area; detecting, using the at least one spectrum compliance probe, within the local area one or both of (i) a first interference caused by a first signal originating from within the local area, wherein the first interference is not allowed by the spectrum license, and (ii) a second interference caused by a second signal originating from outside the local area, wherein the second interference (208) is not allowed by the spectrum license; and controlling the radio communication in response to said detection.

Example implementations of the method as described herein may therefore target the primary user of the spectrum license. Spectrum sensing in normal "cognitive radio" is generally performed by a secondary user of a spectrum license which generally senses activity of a primary user and backs off when a primary user is active. Variants of the method as described herein may, however, involve a primary user performing "cognitive functions", such as spectrum sensing.

The spectrum compliance probe may hereby be incorporated in a mobile device or a (fixed or mobile) network device (e.g. fixed or mobile network radio device) of the wireless communication network, such as, but not limited to the primary user device of the spectrum license, or the spectrum compliance probe may be incorporated in a network device.

It is hereby to be noted that an area which is considered local according to the present disclosure may refer to an area which corresponds, for example, to a property (for example one or more buildings and the immediate space around the one or more buildings belonging to the property owned by an owner), for example an industrial site, or to one or more buildings, or to a harbor, an airport, a hospital, a sports arena or a shopping center, or a city or part of a city or a town or a district of a city or town.

The local area may therefore be confined to a predetermined spatial extent pertaining to, characterized by or restricted to a (particular) place (or places) or position (or positions) in space. The "local" area may therefore be distinguished from, for example, an entire state or country.

An "interference" not being in compliance with the spectrum license may herein be defined as to a signal, detected by the spectrum license probe, within the local area not being in compliance with the spectrum license.

Being in compliance with the spectrum license may refer to one or more of a frequency of a signal, a frequency spectrum of a signal and an amplitude of a signal being in compliance with the spectrum license. Alternatively or additionally, being in compliance with the spectrum license may refer to a utilization level measured, for example, as a fraction of occupied radio resources within a certain time and bandwidth.

In some example implementations, the local system may also be part of the wide area network, for example in an emergency situation. This may mean that, in some examples, the limitations of signal strengths may be higher in such special circumstances. The opposite may also be valid in some examples. The surrounding system may then, in some examples, be able to interfere, for example if the local system goes down.

Any spectrum compliance measurements outlined throughout the present disclosure may, in some examples, include one or more kinds (types) of time and/or frequency filtering and/or averaging. Additionally or alternatively, any spectrum compliance measurements outlined throughout the present disclosure may, in some examples, consider in-band and/or out-of-band transmissions.

In some examples, the signal generated from outside the local area may hereby violate the spectrum license merely based on its signal generation from outside the local area (while the signal may otherwise be in compliance with the spectrum license, given, for example, its amplitude and/or frequency, etc.). In other examples, a signal generated from outside the local area may not necessarily be considered as an interference which triggers radio communication controlling, for example in a case in which an amplitude (as detected within the local area) of the signal which is generated outside the local area does not exceed a predefined threshold (for example background noise threshold). In some examples, this threshold may be seen as a way to offer robustness as discussed above in case of, for example, malfunction in the local area (for example in an emergency).

Variants of the method as described herein may further comprise (for example initially) defining the local area to which the spectrum license is limited.

In some example implementations, a (second) interference caused by a (second) signal originating from outside the local area to which the spectrum license is limited may not be allowed by the spectrum license.

Controlling the radio communication in response to said (first and/or second interference) detection may comprise controlling signal transmission by the primary user device and/or a different device in the wireless communication network, as will be further outlined below.

The at least one spectrum compliance probe may hereby distinguish a first interference from a second interference, for example, based on a spatial orientation between the spectrum compliance probe and the signal which causes the interference. The origin or at least the direction from which the signal which causes the interference comes may be determined using the spectrum compliance probe.

It will be appreciated that the interference may be detected at a position of the at least one spectrum compliance probe by the spectrum compliance probe, wherein the signal causing the interference originates from a position which is different from that of the spectrum compliance probe. In some examples, the direction and/or position of the interference is estimated by the spectrum sensing device (spectrum compliance probe) in order to determine if the interferer is located within the area to which the spectrum license applies or if it originates from outside of said area.

In some variants, the first or second interference not being allowed by the spectrum license comprises one or both of a frequency of the first or second signal and an amplitude of the first or second signal not being allowed by the spectrum license. Implementing this variant of the method may, in some examples, allow for preventing the first signal from being detectable from outside the local area. It is hereby to be noted that the amplitude of the first signal which is allowed by the spectrum license and the amplitude of the second signal which is allowed by the spectrum license may, in some examples, be different. For example, the allowed amplitude of the first signal may be higher according to the spectrum license than the amplitude of the second signal.

It is to be noted that any references throughout the present disclosure as to a "frequency" may equally refer to a "frequency spectrum".

In some example implementations of the method, the controlling of the radio communication in response to said detection is triggered by the amplitude of the first and/or second signal exceeding a threshold amplitude defined by the spectrum license. Once again, this may, in some examples, allow for preventing the first signal from being detectable from outside the local area. In some examples, the controlling of the radio affects the out-of-band filtering parameters in the transmitters (e.g. of a network device).

In some variants of the method, the first interference is caused by a primary user device signal generated by the primary user device located within the local area, and wherein the controlling of the radio communication in response to said detection comprises controlling the primary user device signal in response to the detection of the first interference. This may, in some examples, allow for signal sensing of a signal generated by the primary user device of the spectrum license and controlling signal transmission of the signal generated by the primary user device so as to be in compliance with the spectrum license.

In some example implementations of the method, the second interference caused by the second signal originating from outside the local area may trigger the controlling of the radio communication only if, for example, the amplitude of the second signal is above a threshold. This threshold may, for example, be defined by or equal to a background noise level. Alternatively, controlling the radio communication in response to said detection of the second interference may be triggered for any second interference caused by a second signal originating from outside the local area.

In some variants of the method, the detection of one or both of the first interference and the second interference comprises performing, by the spectrum compliance probe, an interference measurement, wherein the method further comprises reporting, by the spectrum compliance probe, the interference measurement to a control unit, and wherein the controlling of the radio communication in response to said detection comprises controlling, by the control unit, a signal transmission of a device in the wireless communication network.

The communication between the spectrum compliance probe and the control unit may be a wireless communication or may be provided via a wire. In some examples, the communication between the spectrum compliance probe and the control unit is a combination of a wireless communication and a wired communication. The wired probe may hereby, for example, utilize mobile devices and/or smartphones located near the fixed probe to increase the resolution of the probing function (in particular as will be discussed below).

When more than one spectrum compliance probe is implemented, the communication between any one of the spectrum compliance probes and the control unit may be a direct communication between the spectrum compliance probe and the control unit or, alternatively, one or more of the spectrum compliance probes may be in communication with the control unit via one or more other spectrum compliance probes or other devices in the wireless communication network.

In some example implementations, the device controlled by the control unit is the primary user device. The primary user device, i.e. its radio communication properties (for example its signal transmission) may therefore be controlled by the control unit in response to detecting one or both of the first interference and the second interference.

In some variants, when the first interference is detected, the controlling of the device comprises sending, by the control unit, a spectrum compliance command to the device to control the signal transmission of the device so as to be in compliance with the spectrum license. The spectrum compliance command may hereby be sent from the control unit to the device directly or via one or more other devices in the wireless communication network.

In some example implementations, controlling the signal transmission of the device so as to be in compliance with the spectrum license comprises lowering a transmission power for the signal transmission of the device. This may be particularly advantageous insofar that the signal transmitted by the device may not be detectable from outside the local area, which may, for example, increase security of signal transmission within the local area.

In some variants, the method further comprises transmitting, by the at least one spectrum compliance probe, a beacon signal detectable by a device in the wireless communication network to control the radio communication in response to said detection of one or both of the first interference and the second interference. The beacon signal may hereby be used in order to control radio communication within the wireless communication network. The beacon signal may hereby, in some examples, only be detectable by some of the devices within the wireless communication network and/or only some of the devices within the wireless communication network may respond to the beacon signal so as to modify their respective signal transmission characteristics.

In some example implementations, the transmitting of the beacon signal is activated on-demand. This may, in some examples, allow for providing an efficient, in particular energy-efficient, system.

Furthermore, in some variants, the beacon signals are transmitted periodically. This may, for example, allow for ensuring on a regular basis that the spectrum license is being complied with by the devices in the wireless communication network.

In some example implementations of the method, the spectrum license is violated if the beacon signal is transmitted or received from a predefined location within the local area. In some examples, the spectrum license may be considered as being violated if a third party user outside of the area can detect the beacon signal. The predefined location may hereby be, for example, at an edge or edge region (i.e. within a predetermined distance from the edge) of the local area. This may ensure, for example, that the beacon signal is not detectable from outside the local area at all or at least above a certain amplitude (i.e. amplitude threshold).

In some variants of the method, the at least one spectrum compliance probe is deployed at an edge or edge region of the local area.

The edge region may hereby extend to a distance from the edge of, for example, less than 10 meters, less than 5 meters, less than 1 meter, less than 0.5 meters, less than 0.1 meters, or less. It will be understood that the distance from the edge by which the edge region may extend may be defined according to particular needs and/or the layout of the local area and/or wireless communication network.

In some variants, the at least one spectrum compliance probe is in communication with one or more of an access point of the wireless communication network, an access point controller of the wireless communication network, and a terminal of the wireless communication network. One or more of the access point, the access point controller and the terminal may hereby be, in some examples, in communication with the control unit for controlling radio transmission in the wireless communication network. In some examples, the control unit may be coupled to or integral to one or more of the access point, the access point controller, the terminal and the primary user device.

In some example implementations of the method, the device for which radio communication is controlled in response to detecting one or both of the first interference and the second interference is the access point and/or the access point controller and/or the terminal.

In some variants, detecting the first interference and/or the second interference comprises detecting that the first interference and/or the second interference interfere for longer than a threshold period. This may allow for controlling the radio communication in the wireless communication network not being triggered if the first interference and/or the second interference caused by respective signals do not interfere for longer than the threshold period. A short "one-off" first and/or second interference may therefore be ignored.

In some example implementations, the spectrum license is associated with a maximum allowed value of a transmission power of a device in the wireless communication network. This may allow for ensuring that the signal transmitted by any of the devices in the wireless communication network is not detectable from outside the local area.

In some example implementations, the device transmission power of the device is ramped up in two or more transmission power ramping steps for determining the maximum allowed value of the transmission power. This may, in some examples, allow for determining the maximum allowed value of the transmission power without significantly outputting a transmission power of the device which may be (significantly) above the maximum allowed value.

In some variants of the method, the maximum allowed value of the transmission power is associated with a position of the device within the local area. In some examples, the maximum allowed value of the transmission power may be smaller the closer the device is to the edge of the local area. This may allow for ensuring that signals originating from a position close to the edge of the local area are not detectable from outside the local area, while signals originating from a position further away from the edge of the local area (closer to a center or center region of the local area) can have a higher transmission power while still not being detectable from outside the local area.

In some example implementations, the method further comprises measuring, by the device (for example one or more of the access point, the access point controller, the terminal and the primary user device) in the wireless communication network, a beacon transmission power of the beacon signal, wherein the method further comprises determining the maximum allowed value of the transmission power of the device in the wireless communication network based on the measured beacon transmission power.

In some variants, the maximum allowed value of the transmission power of the device in the wireless communication network is determined based on the measured beacon transmission power using an open-loop power control, OLPC, protocol.

In some example implementations of the method, the spectrum license is associated with the maximum allowed value of the transmission power being higher in wireless communication networks which comprise a said spectrum compliance probe (or a plurality of spectrum compliance probes) compared to wireless communication networks without spectrum compliance probes. This is because the first and/or second interference may be detected via a said spectrum compliance probe or probes such that higher transmission powers may not be considered as being risky (or too risky) with regard to signals being detected, for example, from outside the local area, compared to a situation in which no spectrum compliance probe is provided within the wireless communication network. In some example implementations, the device and/or network node transmission power is higher if the device power may be controlled by the spectrum compliance probe. Devices and/or network nodes that are not capable of receiving control commands from said spectrum compliance probe may use a lower transmission power.

In some variants, the method further comprises communicating, by the at least one spectrum compliance probe, a location of the at least one spectrum compliance probe to a device (for example one or more of the access point, the access point controller, the terminal and the primary user device) in the wireless communication network, and wherein the controlling of the radio communication in response to said detection comprises modifying a beam direction or beam selection for the radio communication of the device. This may allow for improving radio communication in the wireless communication network, for example, between the spectrum compliance probe and one or more of the access point, the access point controller, the terminal and the primary user device. In particular, detection of the first interference may hereby be improved.

In some example implementations of the method, the at least one spectrum compliance probe is coupled or integral to a serving access point or user device in the wireless communication network. In some examples, a compact system may hereby be provided in which, for example, the location of the spectrum compliance probe changes when the spectrum compliance probe may be coupled to or integral to the user device. A mobile device in the wireless communication network may therefore detect and report interference to the control unit, for example via the serving access point.

In some variants, the method further comprises testing whether the at least one spectrum compliance probe is functioning. This ensures proper operation functionality of the methods and systems as described herein.

In some example implementations, the testing comprising one or both of an authorized mobile device sending to and reporting on a test beacon from the at least one spectrum compliance probe. Additionally or alternatively, in some variants, at least two spectrum compliance probes are provided, and wherein said testing comprising sending testing signals between the at least two spectrum compliance probes.

In some variants, the method further comprises triggering, in response to said detection of one or both of the first interference and the second interference, positioning determination of one or more devices within the wireless communication network. This may, in some examples, allow for determining an origin of the first signal causing the first interference.

In some example implementations, the method further comprises triggering, in response to said detection of one or both of the first interference and the second interference, one or more of: optically monitoring at least the local area (for example the local area and additionally an area extending beyond the local area up to a predefined distance away from the edge of the local area), acoustically monitoring at least the local area, outputting an optical signal towards at least the local area, outputting an acoustic signal towards at least the local area, detecting/monitoring an object outside of the local area and/or a proximity of the object outside the local area to the local area.

In a related aspect according to the present disclosure, there is provided a computer program product comprising program code portions for performing the method of any one of the variants and example implementations as described herein when the computer program product is executed on one or more computing devices. In some example implementations, the computer program product is stored on a computer-readable recording medium.

In a further aspect according to the present disclosure, there is provided a spectrum compliance probe provided within a local area covered by a wireless communication network, wherein a spectrum license used for allowing radio communication in the wireless communication network is limited to the local area, wherein the spectrum compliance probe is configured to: detect, within the local area, one or both of (i) a first interference caused by a first signal originating from within the local area, wherein the first interference is not allowed by the spectrum license, and (ii) a second interference caused by a second signal originating from outside the local area; and report the detection of one or both of the first interference and second interference to a control unit for controlling the radio communication in the wireless communication network in response to said reporting.

In some variants, the spectrum compliance probe is configured to perform the methods according to the above-specified variants and example implementations (or respective parts thereof).

In a further related aspect of the present disclosure, there is provided a control unit for controlling radio communication in a wireless communication network which covers a local area to which a spectrum license, which is used for allowing the radio communication, is limited, wherein the control unit is configured to: receive a notification, from a spectrum compliance probe, regarding a detection, within the local area, of one or both of (i) a first interference caused by a first signal originating from within the local area, wherein the first interference is not allowed by the spectrum license, and (ii) a second interference caused by a second signal originating from outside the local area; and control the radio communication in the wireless communication network in response to receiving said notification.

In some variants, the control unit is configured to perform the methods according to the above-specified variants and example implementations (or respective parts thereof).

There is further provided a system comprising the spectrum compliance probe and the control unit as described above, wherein the system is configured to control radio transmission of a primary user device of the spectrum license in response to the detection of one or both of the first interference and the second interference.

In some variants, the system is configured to perform the methods according to the above-specified variants and example implementations.

BRIEF DESCRIPTION OF THE DRAWINGS

These and other aspects of the present disclosure will now be further described, by way of example only, with reference to the accompanying figures, wherein like reference numerals refer to like parts throughout, and in which.

DETAILED DESCRIPTION

In the description outlined herein, for purposes of explanation and not limitation, specific details may be set forth, such as a specific network environment in order to provide a thorough understanding of the technique disclosed herein. It will be apparent to one skilled in the art that the technique may be practiced in other embodiments that depart from these specific details. Moreover, while the following embodiments may be primarily described for Long Term Evolution (LTE) and 5G implementations, it is readily apparent that the technique described herein may also be implemented in any other wireless communication network, including a Wireless Local Area Network (WLAN) according to the standard family IEEE 802.11 (for example IEEE 802.11a, g, n or ac; also referred to as Wi-Fi) and/or a Worldwide Interoperability for Microwave Access (WiMAX) according to the standard family IEEE 802.16.

Moreover, those skilled in the art will appreciate that the services, functions, steps and units explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, for example, including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the services, functions, steps and implement the units disclosed herein.

There are several ways in which very local spectrum licenses and methods and system for local spectrum license management as described herein may be implemented.

Figure 1:
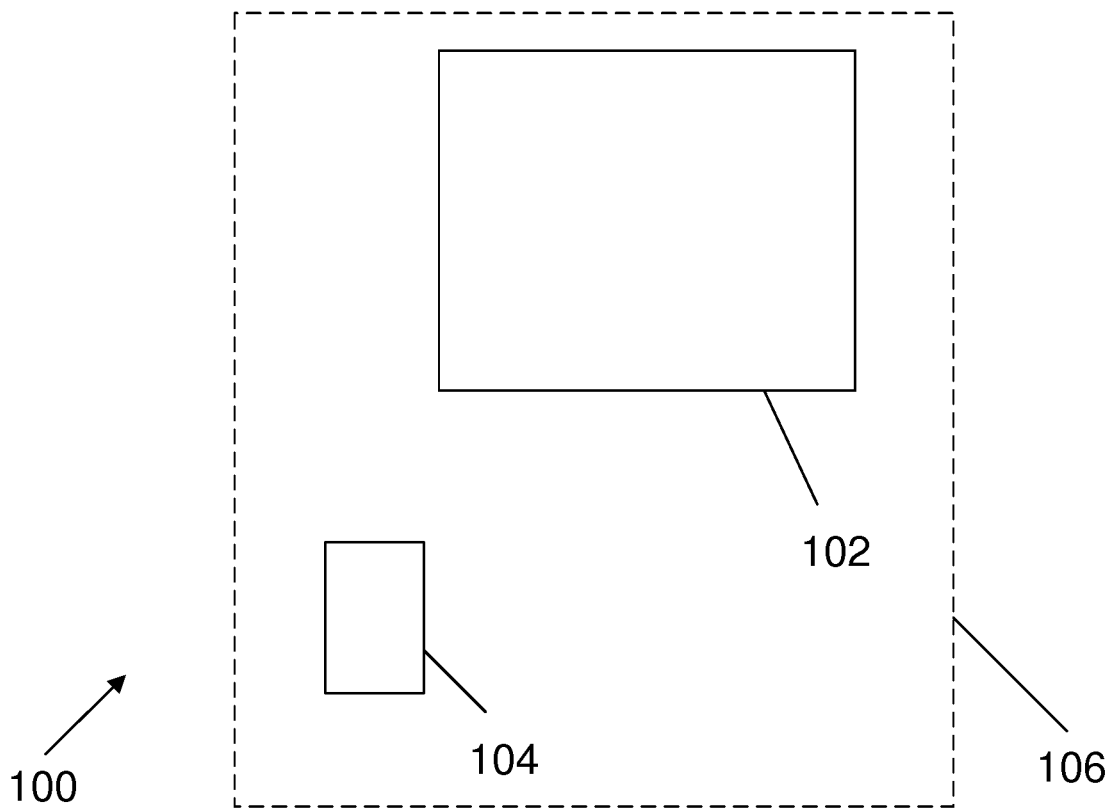
FIG. 1 shows a schematic illustration of a top-view of a manufacturing site to which example implementations according to the present disclosure may be applied.

One example solution is to link the right to acquire a local license to the real-estate ownership. An example area where property-based spectrum licenses could be used is depicted in FIG. 1 which shows an aerial overview of a manufacturing site 100 (production plant), which comprises, in this example, a first building 102, a second building 104 and an edge or border 106 of the property associated with the manufacturing site 100.

It has been realized that the spectrum licensing solution based on local areas (for example property-based local areas) may create several new problems that require solutions.

For example, a license owner of a small area-based spectrum license may need to ensure predictability (unauthorized interference from radio activity outside or inside the licenses area is not acceptable, whereby the interference may be in-band and/or adjacent band and/or above background noise level), detectability (detecting, localizing, and categorizing un-authorized interference may be a first step towards solving the problem), proof of license compliance (in case of complaints, protection against law-suits, compliance reporting, for example a yearly report to a regulator), and efficiency (ensure that the spectrum license is not underutilized or overutilized).

Figure 2:
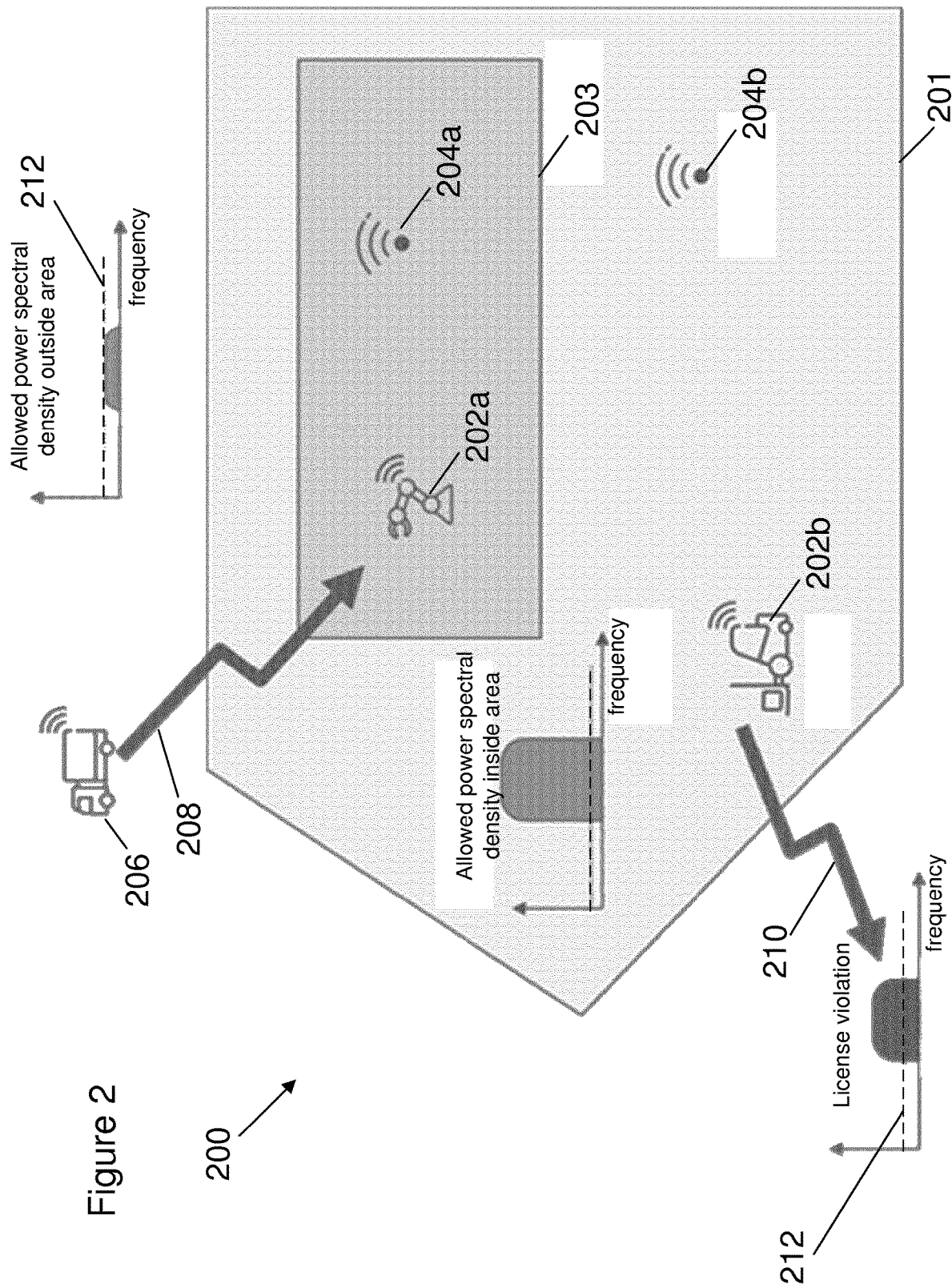
FIG. 2 shows a schematic illustration of how interferences may be caused within the local area according to some example implementations as described herein.

Some of these problems are schematically depicted in FIG. 2 which shows a site 200.

In this example, device 202a is arranged or located within a building 203 and within the local area 201 (to which to spectrum license is limited, whereby the local area 201 may be a property) and device 202b is arranged or located outside of the building 203 and within the local area 201.

Furthermore, an indoor access point 204a is arranged within the building 203 and an outdoor access point 204b is arranged within the local area 201 but outside of the building 203.

A first interference 210 is indicated in FIG. 2 via the corresponding arrow. In this example, the first interference 210 is caused by a signal transmitted by the device 202b. The first interference 210 is hereby caused by the signal exceeding the background noise level 212.

Furthermore, in this example, a second interference 208 is caused by a signal being transmitted from a source 206 which is located outside of the local area 201.

The allowed power spectral density inside the local area 201 is indicated in the center schematic illustration shown in FIG. 2.

As is clear from the schematic illustration shown in FIG. 2, in this example, the maximum transmission power of a signal within a center region of the local area 201 may be higher according to the spectrum license than the maximum transmission power of a signal originating from within the local area 201 but at an edge region of the local area 201 (in this example stemming from device 202*b*).

Furthermore, in this example, according to the spectrum license, the transmission power of the signal originating from outside the local area 201 being below the background noise level 212 is not considered as a violation of the spectrum license.

It is clear from the schematic illustration of FIG. 2 that certain potential problems may arise with very local spectrum licenses, such as for example property-based spectrum licenses. In this example, interference from the local area is not allowed to interfere with activities outside the area and vice versa.

The solution disclosed herein to the problems discussed above is, according to some examples, to deploy different kinds of additional network nodes, here denoted "spectrum compliance probes". The spectrum compliance probes may be connected to a spectrum controller node via a wire or a wireless radio link.

Spectrum compliance probes may be passive (here denoted spectrum compliance sensors) or active (here denoted spectrum compliance beacons). Spectrum compliance sensors may perform interference and signal measurements and report them to a spectrum controller node. Spectrum compliance beacons may transmit signals detectable by other devices that may be used, for example, for device transmission power control.

In some examples, spectrum compliance probes as described herein may be configured to perform functions of both of a spectrum compliance sensor and a spectrum compliance beacon.

As outlined above, in relation to "cognitive radio" (in which a secondary user of a spectrum senses activity of a primary user and backs off when a primary user is active), the present disclosure targets the primary user of the spectrum. Normally, in cognitive radio, it is the secondary user that needs to perform spectrum sensing. Methods according to the present disclosure involve a "primary user" performing "cognitive functions", such as spectrum sensing.

Another key distinguishing feature of the present disclosure is that it does not necessarily require any communication with a central controller or spectrum sharing data base (as is the case in, for example, CBRS) that coordinates multiple networks.

Methods and systems according to the present disclosure further allow for generating proof of spectrum compliance.

The solution as described herein solves the technical problems associated with very local spectrum licenses as described above in a low-complexity, low-cost and scalable way.

Figure 3:
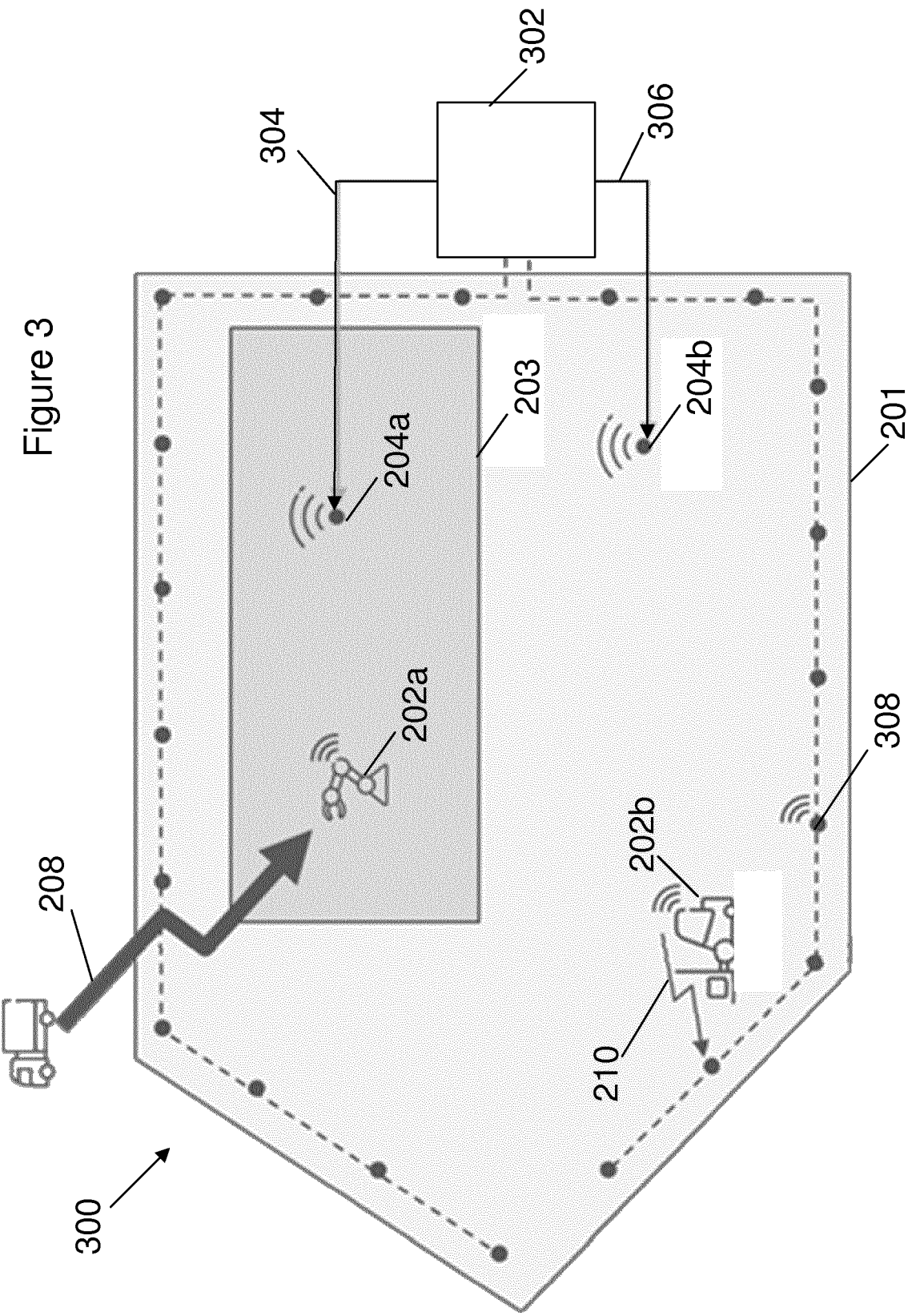
FIG. 3 illustrates a schematic illustration of spectrum compliance probes being deployed in a local area according to some example implementations as described herein.

FIG. 3 shows an example implementation of the present disclosure applied in wireless communication network 300.

In addition to the access points 204*a*, 204*b* and devices 202*a*, 202*b*, this example network consists of additional nodes, denoted spectrum compliance probes 308.

The spectrum compliance probes 308 are, in this example, deployed near the edge of the spectrum license area (i.e. local area 201).

Spectrum compliance probes 308 are communicating with the control unit 302 via a wired or a wireless connection (denoted with dashed lines).

The control unit 302 may, for example, be implemented as a physical node, or it may be part of an existing network node (such as an access point), or it may be implemented in a virtual cloud environment (which may be particularly advantageous so as for the control unit exploiting the large processing power of the cloud). It is hereby to be noted that a cloud environment or cloud-based environment may relate to cloud computing as being an information technology that enables ubiquitous access to shared pools of configurable system resources and higher-level services that can be rapidly provisioned with minimal management effort, often over the Internet.

The control unit 302 may in some example implementations communicate with the access points in the network, for example they may be used to determine the transmission power of access points and/or devices in the network.

In this example, the spectrum compliance probes 308 are deployed in order to enforce that the devices do not cause interference not allowed by the spectrum license, as well as to detect un-authorized interference from activities outside of the spectrum license area.

In this example, the control unit 302 is in communication with the outdoor access point 204*b* so as to control the access point operation (for example to optimize transmission power of the access point).

Furthermore, in this example, the control unit 302 is in communication with the indoor access point 204*a* so as to localize, characterize and report un-authorized interference to the access point.

The communication between the control unit 302 and each of the access points 204*a*, 204*b*, respectively, may be wireless or via a wired connection.

As will be appreciated, different constellations of the arrangement for the access points and devices within the local area may be provided.

Figure 4:
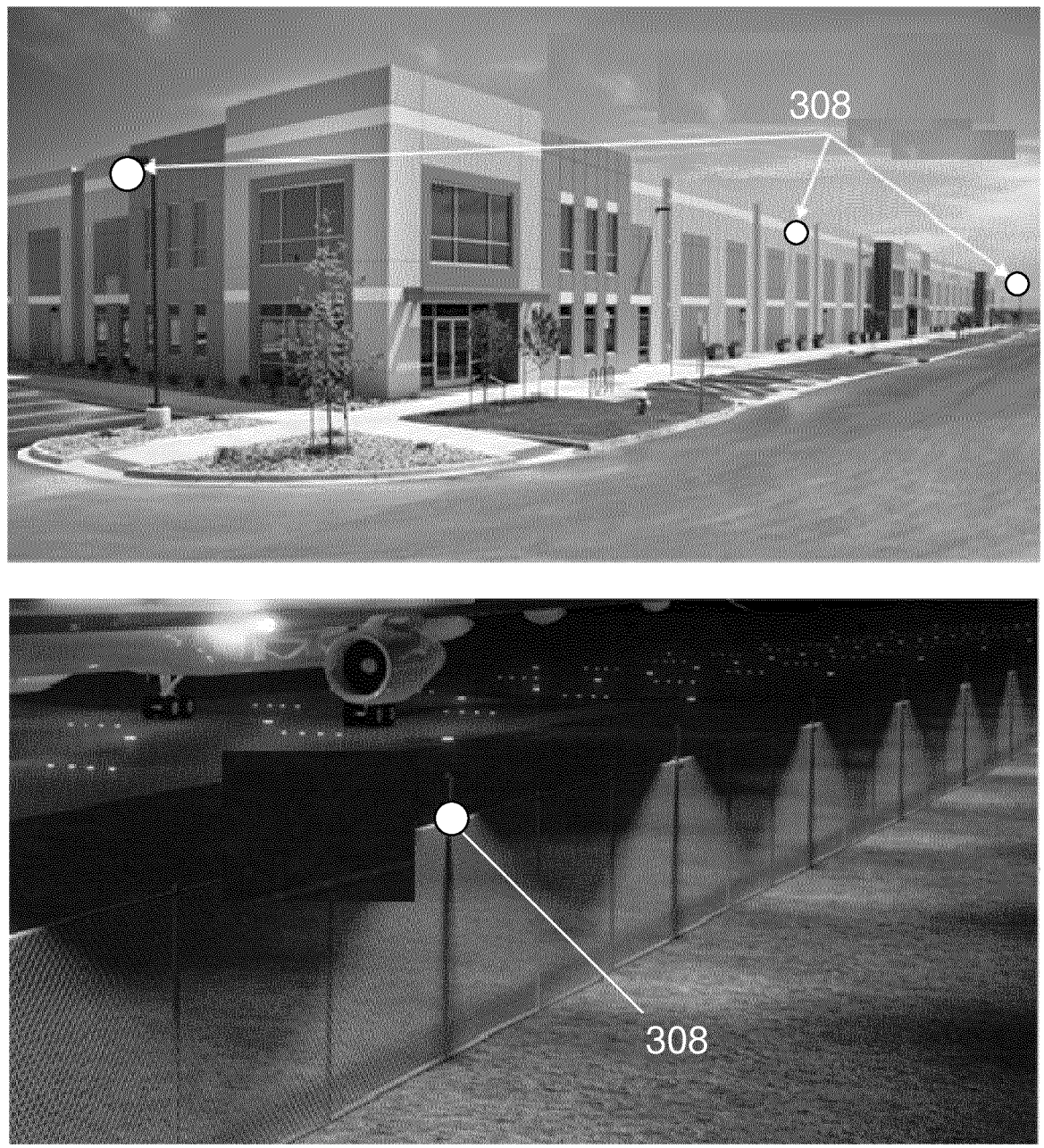
FIG. 4 shows images of example deployment solutions of spectrum compliance probes according to some example implementations as described herein.

FIG. 4 shows example deployment solutions of spectrum compliance probes 308. The top part of FIG. 4 shows a deployment on outdoor lamp-posts or on outside walls of a building. The bottom part depicts a deployment on a perimeter fence of an airport.

Figure 5:
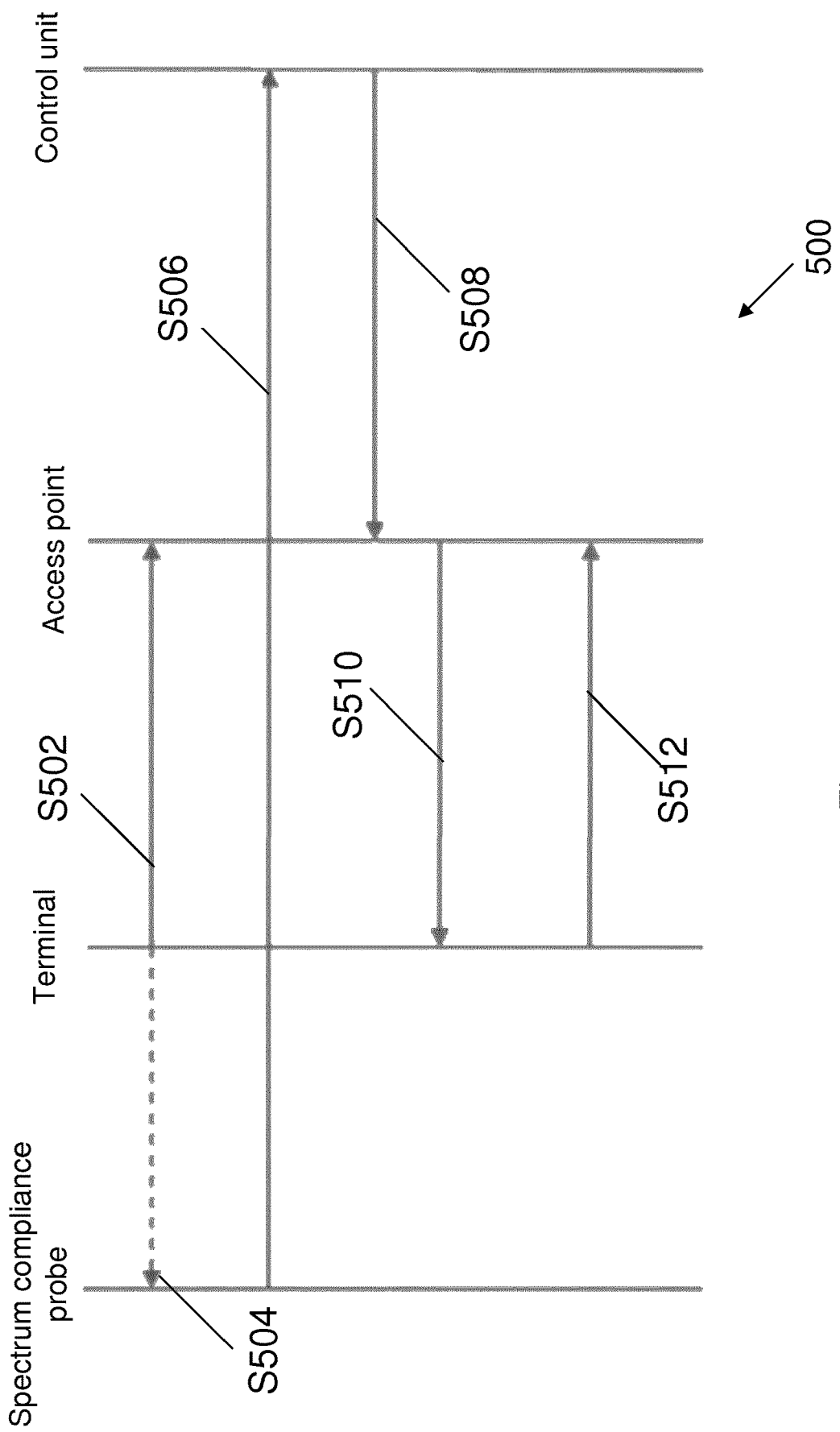
FIG. 5 shows a flowchart of a method according to some example implementations as described herein.

Spectrum compliance probes can be passive sensor devices that are not directly detectable by the terminals in the network. An example implementation method 500 of a passive spectrum compliance sensor is depicted in FIG. 5. However, it will be appreciated that the example implementation shown in FIG. 5 may equally be applicable to a spectrum compliance probe which is additionally configured to transmit beacon signals, as will be further outlined below (for example with respect to FIG. 6).

In this example, a spectrum compliance sensor (spectrum compliance probe) detects at step S504 a high power and high interfering transmission, S502, from a terminal device or access point. This spectrum over-utilization is reported at step S506 to a controller entity (control unit). The controller entity contacts at step S508 one or more access points with a spectrum compliance command (in some examples containing one or more of terminal ID, signal signature ID, interference classification information, such as time/frequency/pilot resources, position, etc. as reported by the spectrum compliance probe). The access point then commands at step S510 the interfering device to modify the transmission beam direction and/or power (in this example the uplink transmission power) in order to comply with the spectrum license. The low(er) power transmission can then be detected at step S512 by the access point.

In some examples, the spectrum license is associated with a maximum time (for example 1-10 ms) for which the interference is allowed to be higher than a threshold. In some examples, the devices need to ramp up their transmission power in several power ramping steps before determining a maximum allowed transmission power for a device in a particular position.

Figure 6:
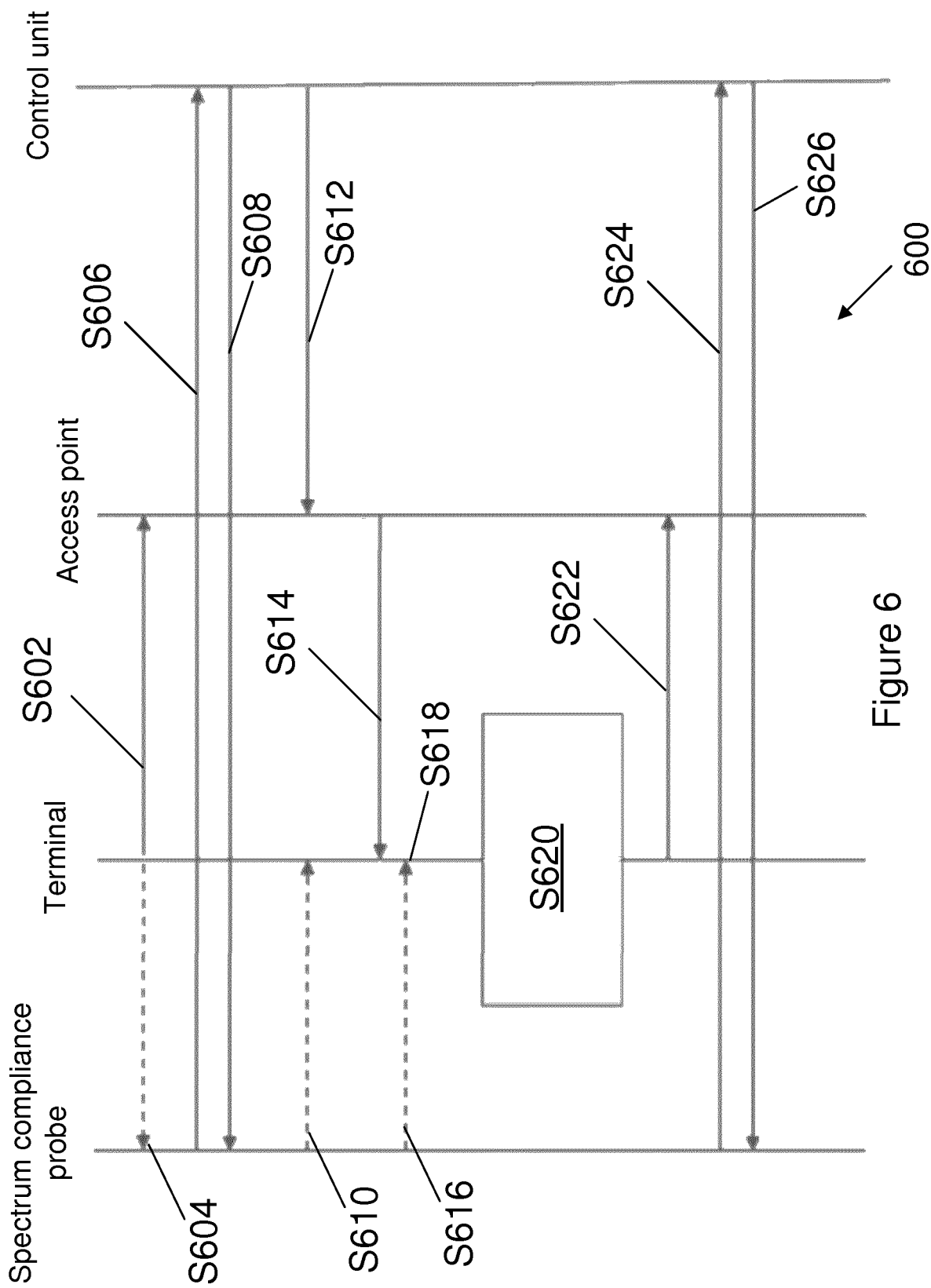
FIG. 6 shows a further flowchart of a method according to some example implementations as described herein.

An example implementation method 600 of an (active) spectrum compliance probe (dubbed here as a "spectrum compliance beacon") is depicted in FIG. 6. A spectrum compliance beacon, i.e. a node actively transmitting a signal (including potential broadcast information) is hereby detectable by the terminals. The spectrum compliance beacons may be always on, or as depicted in FIG. 6, activated on-demand.

In FIG. 6, a high-power transmission, S602, from a terminal near a spectrum compliance probe (detected by the spectrum compliance probe at step S604) triggers a spectrum license violation report to be transmitted at step S606 to a controller entity (control unit). Said controller entity instructs the spectrum compliance probe at step S608 to start transmitting (at step S610 and step S616) a "beacon signal" (interference beacon command). The controller node also informs, at step S612, one or more access points about the existence of this beacon signal and the necessity of commanding terminals to measure on this beacon signal. In this example, the necessity of activating interference beacon measurements is also reported at step S614 by the access point to the terminal.

The terminal detects the beacon signal at step S618 and measures at step S620 the received power of the beacon to determine a maximum allowed transmission power in dependence of the received power of the interference limitation beacon signal (in this example inversely proportional to the received beacon signal power) using an open-loop power control protocol.

At step S622, the terminal then transmits a signal for the access point at lower power transmission.

In this example, a spectrum license compliance report is sent in step S624 by the spectrum compliance probe to the control unit. In response thereto, at step S626, the control unit transmits a deactivate interference beacon command to the spectrum compliance probe.

Figure 7:
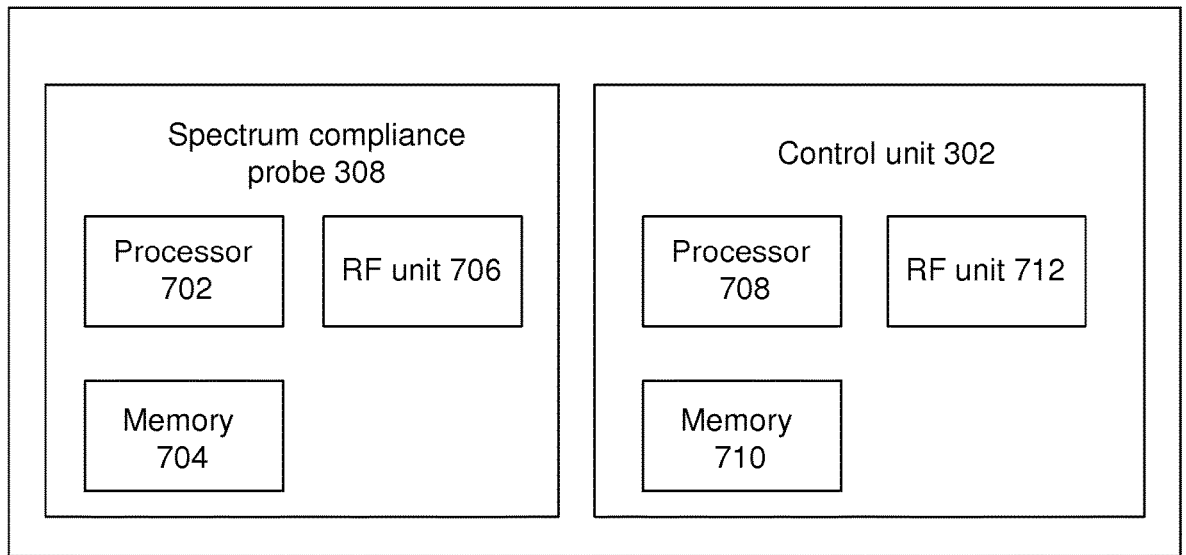
FIG. 7 shows a schematic illustration of a system according to some example implementations as described herein.

FIG. 7 shows a schematic illustration of a system 700 according to some example implementations as described herein.

In this example, the system 700 comprises a spectrum compliance probe 308 and a control unit 302.

The spectrum compliance probe 308 comprises a processor 702, a memory 704 and a radio-frequency (RF) unit 706 via which the spectrum compliance probe 308 may communicate with the control unit and other devices in the wireless communication network.

The memory 704 may store program code portions for performing the methods as described herein, whereby the processor 702 may process the program code portions and/or process interference data obtained via the RF unit 706.

Furthermore, in this example, the control unit 302 comprises a processor 708, a memory 710 and an RF unit 712.

The control unit 302 may communicate with the spectrum compliance probe 308 and other devices (for example terminals and access points) via the RF unit 712.

Figure 8:
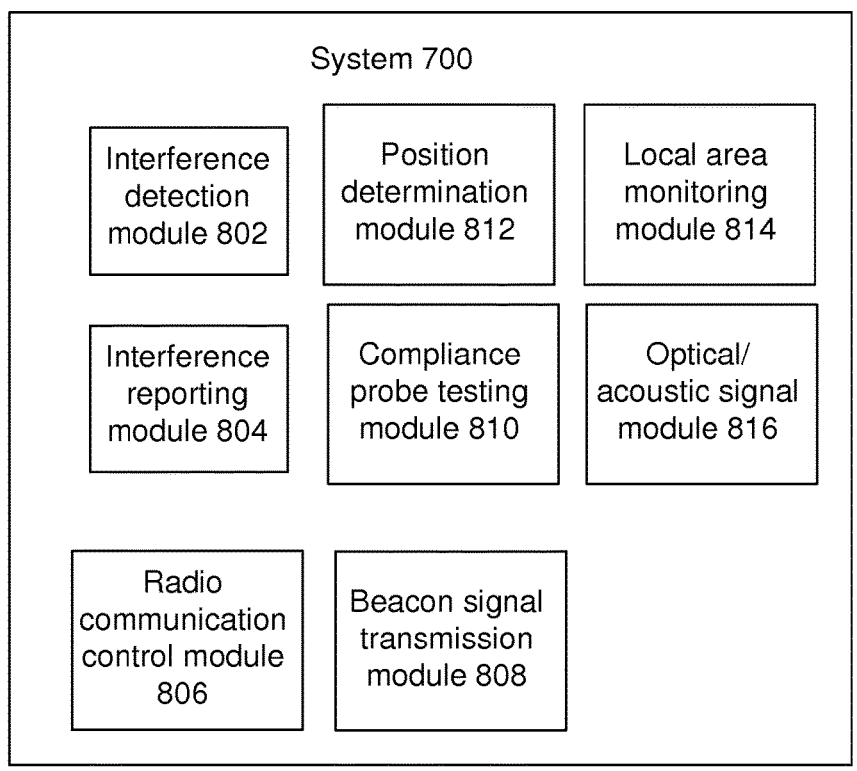
FIG. 8 shows a schematic illustration of a system according to some example implementations as described herein.

A block diagram of a system 700 performing example implementations of the method as described herein is schematically illustrated in FIG. 8.

In this example, the system 700 comprises an interference detection module 802, and interference reporting module 804, a radio communication control module 806, a beacon signal transmission module 808, a compliance probe testing module 810, a position determination module 812, a local area monitoring module 814 and an optical/acoustic signal module 816.

The interference detection module 802 is configured to detect a first and/or second interference as outlined above. The interference reporting module 804 is configured to report a detected first and/or second interference to the control unit. The radio communication control module 806 is configured to control radio communication of one or more devices in the wireless communication network in response to detecting the first and/or second interference. The beacon transmission module 808 is configured to transmit a beacon signal in response to detecting the first and/or a second interference in order to control radio communication of one or more devices in the wireless communication network. The compliance probe testing module 810 is configured to test operability of the one or more spectrum compliance probes arranged within the local area. The position determination module 812 is configured to determine the position of one or more devices within the wireless communication network and/or objects outside of the local area (but, for example, within a certain maximum distance from an edge of the local area). The local area monitoring module 814 is configured to monitor the local area in response to the detection of the first and/or second interference. The optical/acoustic signal module 816 is configured to output one or both of an optical and an acoustic signal in response to the detection of one or both of the first and second interference.

Figure 9:
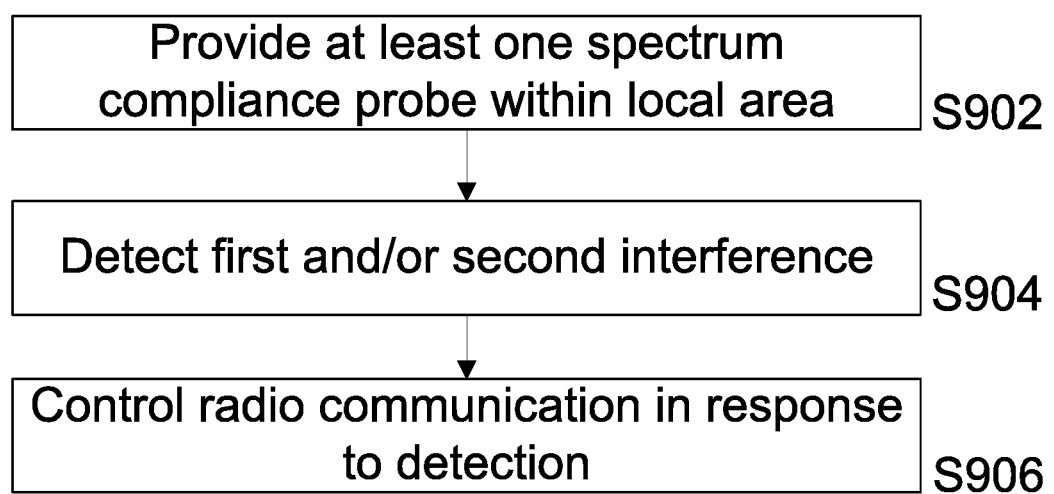
FIG. 9 shows a flowchart of a method according to some example implementations as described herein.

FIG. 9 shows a method 900 according to some example implementations as described herein.

At step S902, at least one spectrum compliance probe is provided within the local area to which the spectrum license is limited. At step S904, one or both of a first interference caused by a first signal originating from within the local area, wherein the first interference is not allowed by the spectrum license, and a second interference caused by a second signal originating from outside the local area is detected using the at least one spectrum compliance probe. At step S906, the radio communication is controlled in response to said detection of one or both of the first interference and the second interference.

In some example implementations, the spectrum compliance probes are only configured (for example by an OSS node) to always transmit interference limitation beacons periodically (for example once every 10-1000 ms). The configuration of the interference limitation beacons may then be provided to the terminals by means of dedicated signaling or broadcasting. Terminals that detect an interference limitation beacon may then be configured with a power control rule that may enable them to autonomously determine a maximum transmission power in compliance with the spectrum license. It is, however, to be noted that transmissions of beacon signals near the spectrum license area may violate the spectrum license. Hence, depending on the details of the spectrum license, this may not be a feasible solution in some scenarios.

In some variants, the spectrum compliance probe may also forward its known location for the access point and user device to modify beam direction or selection.

In some example implementations, the "spectrum compliance nodes" functions are implemented into normal access points.

In some variants, the "spectrum compliance nodes" functions are implemented into normal user devices.

Additional example implementations include a testing procedure. Since spectrum compliance probes might only receive any signal very seldom, it may be very difficult to determine if the probes are actually working or if they are broken. To help testing the functionality of the probes, some authorized mobile devices may send beacons and/or reports on beacons from "spectrum sensors". Spectrum compliance probes may also periodically (for example once per 1-24 hours) listen and report on each other (sensor-to-sensor beacons). It is also possible for maintenance personnel or autonomous robot/drone to "walking the fence", i.e. to force an interference to occur and actively check that all spectrum compliance probes are functional.

In some examples, mobile devices may also detect and report interference to the control unit via the serving access point.

In some variants, the spectrum license may allow higher transmission power of access points and terminals in networks equipped with spectrum compliance probes compared to networks without spectrum compliance probes.

In some examples, the additional spectrum compliance probes may also be used for positioning and communication. Additional value (one or more of positioning, intruder protection, etc.) may be provided with additional infrastructure nodes for spectrum compliance that may contain additional components (one or more of cameras, microphones, speakers, proximity detectors, lighting etc.).

The present disclosure outlines installment of one or more spectrum compliance probes in deployments utilizing (very) local spectrum licenses. Spectrum compliance probes may be listening devices (here denoted sensors) or transmitting devices (here denoted beacons), or be configured as listening and transmitting devices.

A method is described herein for a primary user of a spectrum license used for enabling radio communication between devices in a wireless communication network covering a limited area comprising at least one spectrum probe communicating directly with at least one device in said communications network for ensuring efficient utilization of said spectrum license. Said device may be communicating with one or more access points and/or one or more access point controllers and/or one or more terminals. The spectrum compliance probes may be listening to interference and receiving commands. As outlined above, the spectrum compliance probes may be activated on-demand.

Methods and system as described herein allow for efficient spectrum usage based on one or more of optimizing transmission powers, optimizing transmission beamforming, detecting license infringement and proving spectrum compliance.

Example implementations as described herein may be implemented in industrial Internet of Things applications, ultra-reliable low latency communication applications and critical machine type communication applications.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method for a primary user device of a spectrum license used for allowing radio communication in a wireless communication network covering a local area to which the spectrum license is limited, wherein the method comprises:
   providing at least one spectrum compliance probe within the local area;
   detecting, using the at least one spectrum compliance probe, within the local area one or both of
   (i) a first interference caused by a first signal originating from within the local area, wherein the first interference is not allowed by the spectrum license, and
   (ii) a second interference caused by a second signal originating from outside the local area, wherein the second interference is not allowed by the spectrum license; and
   controlling the radio communication in the wireless communication network in response to said detection.

2. The method as claimed in claim 1, wherein the first or second interference not being allowed by the spectrum license comprises one or both of a frequency of the first or second signal and an amplitude of the first or second signal not being allowed by the spectrum license, wherein the controlling of the radio communication in response to said detection is triggered by:
   the amplitude of the first and/or second signal exceeding a threshold amplitude defined by the spectrum license, and/or
   the amplitude of the second signal exceeding a background noise level detected by the at least one spectrum compliance probe.

3. The method as claimed in claim 1, wherein the controlling the radio communication in the wireless communication network in response to said detection comprises controlling an out-of-band filtering parameter in a transmitter.

4. The method as claimed in claim 1, wherein the first interference is caused by a primary user device signal generated by the primary user device located within the local area, and wherein the controlling of the radio communication in response to said detection comprises controlling the primary user device signal in response to the detection of the first interference.

5. The method as claimed in claim 1, wherein a spectrum compliance measurement to determine whether the spectrum license is complied with is based on (i) a time and/or frequency filtering and/or (ii) a time and/or frequency averaging.

6. The method as claimed in claim 1, wherein the detection of one or both of the first interference and the second interference comprises performing, by the spectrum compliance probe, an interference measurement,
   wherein the method further comprises reporting, by the spectrum compliance probe, the interference measurement to a control unit, and
   wherein the controlling of the radio communication in response to said detection comprises controlling, by the control unit, a signal transmission of a device in the wireless communication network, and
   wherein the control unit is comprised in a cloud-based environment.

7. The method as claimed in claim 6, wherein, when the first interference is detected, the controlling of the device comprises sending, by the control unit, a spectrum compliance command to the device to control the signal transmission of the device so as to be in compliance with the spectrum license, and wherein controlling the signal transmission of the device so as to be in compliance with the spectrum license comprises lowering a transmission power for the signal transmission of the device.

8. The method as claimed in claim 1, further comprising testing whether the at least one spectrum compliance probe is functioning, and wherein said testing comprising one or both of an authorized mobile device sending to and reporting on a test beacon from the at least one spectrum compliance probe.

9. The method as claimed in claim 8, wherein at least two spectrum compliance probes are provided, and wherein said testing comprising sending testing signals between the at least two spectrum compliance probes.

10. The method as claimed in claim 1, further comprising triggering, in response to said detection of one or both of the first interference and the second interference, one or more of:
positioning determination of devices within the wireless communication network,
optically monitoring at least the local area,
acoustically monitoring at least the local area,
outputting an optical signal towards at least the local area,
outputting an acoustic signal towards at least the local area, and
detecting a proximity of an object outside of the local area to the local area.

11. The method as claimed in claim 1, further comprising transmitting, by the at least one spectrum compliance probe, a beacon signal detectable by a device in the wireless communication network to control the radio communication in response to said detection of one or both of the first interference and the second interference, wherein the transmitting of the beacon signal is activated on-demand, or wherein beacon signals are transmitted periodically, and wherein the spectrum license is violated if the beacon signal is transmitted or received from a predefined location within the local area.

12. The method as claimed in claim 1, wherein a determination of whether the first or second interference is not allowed by the spectrum license is based on a utilization level measured as a fraction of occupied radio resources within a predefined time and/or bandwidth.

13. The method as claimed in claim 1, wherein the at least one spectrum compliance probe is coupled or integral to a serving access point or user device in the wireless communication network.

14. The method as claimed in claim 1, further comprising communicating, by the at least one spectrum compliance probe, a location of the at least one spectrum compliance probe to a device in the wireless communication network, and wherein the controlling of the radio communication in response to said detection comprises modifying a beam direction or beam selection for the radio communication of the device.

15. The method as claimed in claim 1, wherein the at least one spectrum compliance probe is deployed at an edge or edge region of the local area, wherein the at least one spectrum compliance probe is in communication with one or more of: an access point of the wireless communication network, an access point controller of the wireless communication network, and a terminal of the wireless communication network.

16. The method as claimed in claim 1, wherein the spectrum license is associated with a maximum allowed value of a transmission power of a device in the wireless communication network, wherein the device transmission power of the device is ramped up in two or more transmission power ramping steps for determining the maximum allowed value of the transmission power, wherein the maximum allowed value of the transmission power is associated with a position of the device within the local area, and wherein the spectrum license is associated with the maximum allowed value of the transmission power being higher in wireless communication networks which comprise a said spectrum compliance probe compared to wireless communication networks without spectrum compliance probes.

17. The method as claimed in claim 16, further comprising measuring, by the device in the wireless communication network, a beacon transmission power of the beacon signal,
wherein the method further comprises determining the maximum allowed value of the transmission power of the device in the wireless communication network based on the measured beacon transmission power, and
wherein the maximum allowed value of the transmission power of the device in the wireless communication network is determined based on the measured beacon transmission power using an open-loop power control (OLPC) protocol.

18. The method as claimed in claim 1, wherein detecting the first interference and/or the second interference comprises detecting that the first interference and/or the second interference interfere for longer than a threshold period.

19. A spectrum compliance probe provided within a local area covered by a wireless communication network, wherein a spectrum license used for allowing radio communication in the wireless communication network is limited to the local area,
wherein the spectrum compliance probe is configured to:
detect, within the local area, one or both of (i) a first interference caused by a first signal originating from within the local area, wherein the first interference is not allowed by the spectrum license, and (ii) a second interference caused by a second signal originating from outside the local area; and
report the detection of one or both of the first interference and second interference to a control unit for controlling the radio communication in the wireless communication network in response to said reporting.

20. A control unit for controlling radio communication in a wireless communication network which covers a local area to which a spectrum license, which is used for allowing the radio communication, is limited,
wherein the control unit is configured to:
receive a notification, from a spectrum compliance probe, regarding a detection, within the local area, of one or both of (i) a first interference caused by a first signal originating from within the local area, wherein the first interference is not allowed by the spectrum license, and (ii) a second interference caused by a second signal originating from outside the local area; and
control the radio communication in the wireless communication network in response to receiving said notification.

* * * * *